United States Patent
Dickens et al.

[11] Patent Number: 6,005,228
[45] Date of Patent: Dec. 21, 1999

[54] ELECTRICAL HEATING SYSTEMS

[76] Inventors: Michael D. Dickens, 332 Camaritas Way, Danville, Calif. 94526; Dinesh C. Gupta, 43564 Greenhills Way, Fremont, Calif. 94539; Albert J. Highe, 105 Montalvo Rd., Redwood City, Calif. 94062

[21] Appl. No.: 08/920,525

[22] Filed: Aug. 29, 1997

Related U.S. Application Data

[63] Continuation-in-part of application No. 08/614,034, Mar. 12, 1996, abandoned.

[51] Int. Cl.$^6$ .................................................. H05B 1/02
[52] U.S. Cl. ........................ 219/483; 219/494; 219/492; 219/497; 307/38; 392/482
[58] Field of Search ..................... 219/502, 508, 219/494, 497, 483–486, 481, 504, 505, 492; 307/117, 38–41; 392/480, 482

[56] References Cited

U.S. PATENT DOCUMENTS

| | | | |
|---|---|---|---|
| 4,061,870 | 12/1977 | Mizushina | 13/24 |
| 4,267,603 | 5/1981 | Beck et al. | 364/477 |
| 4,702,305 | 10/1987 | Beckey et al. | 165/12 |
| 4,740,886 | 4/1988 | Tanifuji et al. | 364/150 |
| 4,859,834 | 8/1989 | Hausler et al. | 219/497 |
| 5,023,430 | 6/1991 | Brekkestran et al. | 219/486 |
| 5,026,971 | 6/1991 | Payne et al. | 219/483 |
| 5,280,158 | 1/1994 | Matava et al. | 219/492 |
| 5,439,049 | 8/1995 | Scheu | 165/22 |
| 5,580,478 | 12/1996 | Tanamachi et al. | 219/502 |

FOREIGN PATENT DOCUMENTS

| | | |
|---|---|---|
| 0 532 450 A2 | 3/1993 | European Pat. Off. |
| 42 25 622 A1 | 3/1993 | Germany |
| 2 153 554 | 8/1985 | United Kingdom |

OTHER PUBLICATIONS

Ashrae Applications Handbook (1995), 42.2, 42.3.
Ashrae Handbook, 1973, 34.2–34.6 and 34.12–34.13.
Basic Principles of Automatic Control (1981, 192, 193, 198, 199.

(List continued on next page.)

*Primary Examiner*—Mark Paschall
*Attorney, Agent, or Firm*—Marguerite E. Gerstner; Herbert G. Burkard

[57] ABSTRACT

A thermally insulated substrate, e.g. a system of pipes, is maintained above a selected minimum temperature by means of one or more electrical heaters, preferably elongate self-regulating heaters. Each heater is successively switched on for a heat-up period and then off for a cool-down period. The durations of these periods are successively determined by reference to the ambient air temperature adjacent the substrate at an earlier time, e.g. at the end of the previous cool-down period. The method is particularly useful for temperature-maintenance systems in which a number of heaters are used to heat a complex system of pipes. The durations of the heat-up and cool-down periods for each heater (or for a group of two or more heaters) are separately determined by means of a single microprocessor. The microprocessor (a) is linked to an ambient air temperature sensor; (b) contains in its memory the relevant information about each heater, the pipes which it heats, and the thermal insulation surrounding the pipes; (c) is programmed to calculate the durations of the heat-up and cool-down periods; and (d) is linked to a number of switching means, one for each heater or group of heaters.

10 Claims, 1 Drawing Sheet

OTHER PUBLICATIONS

Chemical Engineering, May 1995, "Proven Tools and Techniques for Electric Heat Tracing" (Gupta and Rafferty).

Encyclopedia of Chemical Processing and Design, (1997) pp. 362–372.

Environmental Control Principles, 1981, 34.22.

Heating, Ventilating, Air Conditioning Guide, 28 (1950), 817.

Honeywell Catalog, Jun. 1979, pp. 170–173.

IEEE Standard 515—1983, p. 20.

Piping Handbook, pp. B241–242.

Raychem Design Guide, "MoniTrace 700–MP System".

Search Report for International Application No. PCT/US97/03773, mailed Jun. 23, 1997.

ELECTRICAL HEATING SYSTEMS

CROSS REFERENCE TO RELATED APPLICATIONS

This application is a continuation-in-part of my, commonly assigned application Ser. No. 08/614,034, filed Mar. 12, 1996, now abandoned. The entire disclosure of that application is incorporated by reference herein.

BACKGROUND OF THE INVENTION

1. Field of the Invention

This invention relates to electrical heating systems.

2. Introduction to the Invention

Elongate electrical heaters are often used to heat systems of pipes and/or storage vessels which contain liquids and which are thermally insulated. Most such systems fall into two different categories. In the first category, the liquid is water, and the objective is to ensure that the water does not freeze. In typical freeze-protection systems in this category, one or more heaters are controlled by a single thermostat which senses the ambient air temperature and switches the heater(s) on if the ambient air temperature falls below a lower limit temperature, e.g. 40° F., and switches the heater (s) off if the ambient temperature increases to a higher limit temperature. e.g. 43° F. One disadvantage of such systems is that the heater is switched on continuously even though this is not required (except when the ambient temperature is at the lowest value at which the heater can prevent the water from freezing). Another disadvantage is the loss of control if the thermostat fails, which may not be immediately apparent. Another disadvantage is the cost of the thermostat, especially when the current drawn by the heater(s) is large, either in the steady state or when the heater is first switched on.

In the second category of systems, the liquid is not water (e.g. it is an organic liquid or a solution, slurry, suspension, or dispersion in water or an organic liquid) and the objective is to maintain the liquid at a relatively high temperature, e.g. 45° F. or more, as it is moved through the system from one storage vessel or treatment station to another. Such systems are used, for example, in hydrocarbon refineries and food processing plants. In typical temperature-maintenance systems of this type, there are a number of different sectors, and each sector is heated by a different heater. Each heater is controlled by a line-sensing thermostat which senses the temperature at a selected point on one of the pipes heated by that heater. Once the sector has been heated to the maintenance temperature, the heater is switched on and off during successive and alternating heat-up and cool-down periods, and the duration of those periods is controlled by the line-sensing thermostat. The line-sensing thermostat turns the heater on when the sensed temperature falls to a lower limit, and turns the heater off when the sensed temperature reaches an upper limit. Temperature-maintenance systems require very careful design, in particular when the flow pattern may be deliberately changed, thus producing different thermal demands. The system must be divided into sectors which can appropriately be heated by a single heater, and within each sector, the line-sensing thermostat must be placed at the most vulnerable part (i.e. the part most likely to drop below the maintenance temperature in any possible flow pattern within the sector). The most vulnerable part is usually the smallest pipe in the system and/or a pipe in which there may be no liquid flow. In many temperature-maintenance systems, there are more than 5 sectors, each with its own heater, and systems containing more than 20 sectors are by no means unusual. In at least some of the sectors, the heater may be quite short, e.g. less than 20 feet long, and the average circuit length (total length of all the heaters divided by the number of sectors) may be 25–40 feet. These systems suffer from a number of disadvantages, for example the cost of the thermostats, of placing the thermostats at the most vulnerable parts of the respective sectors, and of running appropriate wiring to the thermostats; the loss of control if a thermostat fails (which may not be immediately apparent); the difficulty of replacing a failed thermostat, especially if the most vulnerable part of the sector is not readily accessible; and the need to reposition at least some of the thermostats if the system is changed or a new flow pattern is adopted.

SUMMARY OF THE INVENTION

We have discovered, in accordance with the present invention, an improved method of controlling the way in which an electrical heater is used to maintain a thermally insulated substrate at or above a desired maintenance temperature. In this improved method, the ambient air temperature is sensed at discrete times and is used, in combination with the identified thermal characteristics of the system (i.e. of the heater, the substrate and the thermal insulation), to determine the duration of subsequent periods in which the heater is switched on (heat-up periods) or switched off (cool-down periods), so that all parts of the substrate heated by that heater are maintained at or above the desired maintenance temperature. The ambient air temperature can be the sole variable which is used to determine the durations of the heat-up and cool-down periods, or other variables can also be taken into account, e.g. the voltage of the power supply. The method can also include operating the heater in a known way and comparing the expected temperature of the substrate, based on the identified thermal characteristics, with the actual temperature of the substrate; and using the comparison to make an appropriate adjustment to the durations of the heat-up and cool-down periods.

This invention makes use of the fact that, knowing the ambient temperature and the thermal characteristics of a heater, a substrate, and thermal insulation surrounding the heater and the substrate, and assuming that the ambient temperature does not change, it is possible to predict the effect of delivering a known amount of heat to the substrate over a known cycle time. For example, if the substrate is at a lower-limit temperature $T_L$ and is to be maintained between $T_L$ and an upper-limit temperature $T_U$, it is possible to determine how long the heater should be switched on to heat the substrate to $T_U$, and how long the heater can be switched off before the substrate has cooled back to $T_U$. Similarly, if the substrate is at $T_L$, it is possible to determine how to divide a fixed period (e.g. of 10 minutes) between heating and cooling in order for the substrate to be heated sufficiently to return to $T_L$ at the end of the fixed period.

We have realized, in accordance with the present invention, that since ambient air temperatures change relatively slowly (and the thermal insulation further slows the effect of such changes) and since some variation in the temperature of the heated substrate can be tolerated (provided that the temperature does not drop below a specified minimum), the disadvantages described above can be mitigated or overcome by (A) determining the thermal characteristics of the "most vulnerable part of the system", this term being used to denote that part of the system which contains the most vulnerable part of the substrate, i.e. that part of the substrate which is most likely to drop below a selected minimum temperature; (B) determining, for the ambient temperature at a particular time (and assuming that the ambient temperature does not change), the durations of heat-up and cool-down periods which will maintain the most vulnerable part of the substrate above a desired lower limit temperature; and (C) switching the heater on for the heat-up period and off for the cool-down period. This cycle is repeated, using the ambient temperature at successive discrete times as the basis for determining the durations of the heat-up and cool-down periods. The durations of the heat-up and cool-down periods are preferably determined on the basis of (1) a lower limit temperature which is somewhat higher than the desired maintenance temperature (to allow for the possibility that the ambient temperature drops during the heat-up and/or cool-down period) and (2) (a) an upper limit temperature, which is the desired maximum temperature which the most vulnerable part should reach (assuming that the ambient temperature remains constant) and/or (b) a desired cycle time (i.e. the sum of the durations of the heat-up and cool-down periods). The parts of the substrate other than the most vulnerable part will at all times be at temperatures higher than the most vulnerable part. The determination of the durations of the heat-up and cool-down periods is preferably carried out by a microprocessor which (a) is linked to an ambient air temperature sensor, (b) is programmed to determine the durations on the basis of the input from the sensor and stored information about the thermal characteristics of the most vulnerable part of the system, and (c) sends signals to as contacter or other switching device which controls delivery of electrical power to the heater.

The thermal characteristics of the system include the thermal capacity of the substrate, the power of the heater, and the thickness and thermal capacity of the insulation. In some cases, the thermal characteristics can be estimated with sufficient accuracy to permit the durations of the heat-up and cool-down periods to be determined on the basis of those estimates. However, when this is done, it is conventional (in order to ensure that the substrate does not drop below the specified minimum temperature) to use very conservative estimates. As a result, the substrate is often maintained at a temperature higher than is necessary. This is not only wasteful, but can also adversely affect the liquid flowing through the pipes; another disadvantage, especially for systems in hazardous areas, is that the surface temperature of the heater may be higher than is desirable. Excessive heating of this kind is particularly likely to arise if the rated power of the heaters is used to determine the heat-up and cool-down periods, because the power generated by a heater is usually more than its rated power, though by an unknown amount. A preferred procedure, therefore, comprises measuring the actual temperature of the most vulnerable part of the substrate at one or more times during a known heating and/or cooling procedure; comparing that temperature with the temperature predicted by the estimates of the thermal characteristics; and making an appropriate adjustment to the way in which the durations of the heat-up and cool-down periods are calculated. This procedure is carried out as part of the installation of the heater and insulation on the substrate, and can also be carried out at intervals thereafter in order to check whether there have been any changes in the thermal characteristics of the system.

In an alternative embodiment, the thermal characteristics of the system are not estimated at all, but are determined empirically by measuring the temperature of the most vulnerable part of the substrate at one or more times during a known heating (and optionally cooling) procedure.

The method described above can be modified in a number of different ways, including the following.

(a) The system can be divided into a number of zones which have different heating requirements and each of which is heated by one or more different heaters, and the durations of the heat-up and cool-down periods for each zone are then determined separately. The determination for each zone can be made on the basis of the ambient air temperature sensed at a single location; or the determinations for different zones can be made on the basis of the ambient air temperature sensed at different locations; or the determinations can be made on the basis of the lowest ambient air temperature sensed at two or more different locations.

(b) The determination of the durations of the heat-up and cool-down periods must be related to the thermal characteristics of the most vulnerable part of the system. As noted above, these characteristics can be determined empirically or theoretically for a precisely identified most vulnerable part. However, in some cases, it may be easier to determine the durations on the basis of a reference substrate, heater and insulation which are related to, but not necessarily the same as, the most vulnerable part (or indeed any part) of the actual substrate, heater, and insulation.

(c) In the simplest case, the ambient air temperature is sensed at a single time during each cycle of heat-up and cool-down (e.g. at the end of each cool-down period) and is used as the sole variable to determine the durations of the immediately following heat-up and cool-down periods. However, more complicated methods can be used to determine the heat-up and cool-down durations. For example, the durations can be a function of two or more ambient temperatures (for example to take account of relatively rapid rates of change of ambient temperature), and/or can be a function of one or more ambient temperatures which are sensed at intervals determined by the ambient temperatures themselves. Other methods for determining the durations of the heat-up and cool-down periods can be used, provided that one or more ambient temperatures are used to determine the amount of heat delivered to the substrate over a defined period in the future.

The invention provides many advantages over existing systems, in particular the elimination of all or most of the thermostats now employed. The invention is particularly useful for controlling the heaters in temperature-maintenance systems, especially those containing two or more zones which together make up a complex arrangement of pipes, each zone being heated by one or more heaters, and the heater(s) in each zone being separately controlled by a single microprocessor which determines, for each zone separately, the durations of the heat-up and cool-down periods of the heater(s) therein. Elimination of (or at least a reduction in the number of) the conventional line-sensing thermostats and the associated wiring results in cost savings which far outweigh the additional expense of an ambient air temperature sensor, a microprocessor, and a number of contacters, each linked to the output of the microprocessor for a single heater or for a single group of heaters whose heat-up and cool-down requirements are the same. The reduced number of components also improves the operating reliability of the system. Another advantage is that the way in which the heaters supply heat can easily be changed, merely by reprogramming the microprocessor, in order to take account of modifications of the system and/or the way in which the liquid flows through it. A typical temperature-maintenance system to which this invention can most advantageously be applied contains at least 5 heaters, preferably at least 10 heaters, each at least 15 feet, preferably at least 25 feet long, with preferably at least some of those heaters being 50 to 150 feet long.

The invention can also be used to control a single heater for a freeze protection system. However, the added expense of an ambient air temperature sensor, a microprocessor, and a contacter (or other switching mechanism) may not outweigh the lower operating costs of the new system, except where high currents make it necessary for conventional systems to use large and expensive thermostats.

In a first preferred aspect, this invention provides a method of heating a substrate by means of a plurality of different electrical heaters, the substrate being surrounded by thermal insulation and the heaters lying between the substrate and the thermal insulation, the substrate comprising at least two different zones and each zone being heated by one or more heaters which heat only that zone, wherein each of the heaters is switched on and off during successive and alternating heat-up and cool-down periods whose durations (a) ensure that all parts of the substrate are maintained at or above a selected minimum temperature, and (b) are successively determined at successive discrete times, the determinations being carried out by a single microprocessor, independently for each zone, as a function of ambient air temperature in the vicinity of the substrate at the time of the determination or at one or more discrete earlier times.

In a second preferred aspect, the invention provides a method of heating a fluid transfer system comprising a plurality of pipes which are surrounded by thermal insulation, the system comprising a plurality of zones having different heating requirements and each of the zones including at least one elongate electrical heater which (i) lies between the pipes in that zone and the thermal insulation surrounding them, and (ii) is switched on and off during successive heat-up and cool-down periods, thereby maintaining all the pipes in that zone above a minimum temperature, the method comprising, for each of the zones separately, (1) determining a heat-up duration for each successive heat-up period as a function of ambient air temperature at one or more discrete times before the end of the heat-up period;

(2) determining a cool-down duration fore each successive cool-down period as a function of ambient air temperature at one or more discrete times before the end of the cool-down period;

(3) switching the heater on daring the successive heat-up periods for the heat-up durations determined in step (2); and (4) switching the heater off during the successive cool-down periods for the cool-down durations determined in step (3).

In a third preferred aspect, the invention provides a method of maintaining a substrate above a minimum temperature by means of an electric heater, the heater being switched on and off during successive and alternating heat-up and cool-down periods, the substrate being thermally insulated by thermal insulation, and the heater lying between the substrate and the thermal insulation, the method comprising (1) determining a heat-up duration for each successive heat-up period as a function of ambient air temperature in the vicinity of the substrate at one or more discrete times before the end of the heat-up period;

(2) determining a cool-down duration for each successive cool-down period as a function of ambient air temperature in the vicinity of the substrate at one or more discrete times before the end of the cool-down period;

(3) switching the heater on during the successive heat-up periods for the heat-up durations determined in step (2); and (4) switching the heater off luring the successive cool-down periods for the cool-down durations determined in step (3);

the sum of each heat-up duration and the immediately succeeding cool-down duration being 2 to 60 minutes.

In a fourth preferred aspect, the invention provides a controller which can be used to control an electrical heater which is switched on and off during successive and alternating heat-up and cool-down periods, and which comprises (a) a sensor for sensing ambient air temperature;

(b) switching means for causing an electric heater to be connected to or disconnected from a source of electrical power; and (c) a regulator which
  (i) is operatively connected to the sensor and the switching means,
  (ii) can operate the switching means so that the heater is connected to the power source during the heat-up periods and is disconnected from the power source during the cool-down periods, and
  (iii) comprises determining means which can determine heat-up and cool-down durations for the heat-up and cool-down periods as a function of the ambient air temperature sensed by the sensor at one or more discrete earlier times, said earlier times being separated by a time of at least 1 minute.

In a fifth preferred aspect, the invention provides a regulator which can be used to control a plurality of electrical heaters which heat separate zones of a thermally insulated substrate, the regulator comprising (1) at least one input port for receiving information from a sensor for sensing ambient air temperature;

(2) a plurality of output ports, each of the output ports being capable of sending signals to respective switching means for causing each electrical heater in respective zones to be connected to or disconnected from a source of electrical power; and (3) a microprocessor which (a) will receive information about ambient air temperatures from the input port, (b) comprises a memory in which there is recorded, for each zone, thermal characteristics corresponding to (i) that part of the zone which cools most rapidly, (ii) the thermal insulation surrounding said part, and (iii) the electrical heater heating said part, (c) is programmed to calculate, separately for each of the zones and at successive discrete times, durations of successive alternating heat-up and cool-down periods which are the time periods needed, at the ambient temperature received from the input port, to heat said part of the zone from a lower limit temperature $T_L$ to a higher temperature and then to cool back to $T_L$ at the end of the cool-down period, and (d) will send signals to an output port associated with the appropriate zone to switch said heater on and off during successive and alternating heat-up and cool-down periods.

BRIEF DESCRIPTION OF THE DRAWING

The invention is illustrated in the accompanying drawing, in which the FIGURE is a diagrammatic illustration of a system of the invention.

DETAILED DESCRIPTION OF THE INVENTION

Figure 1:
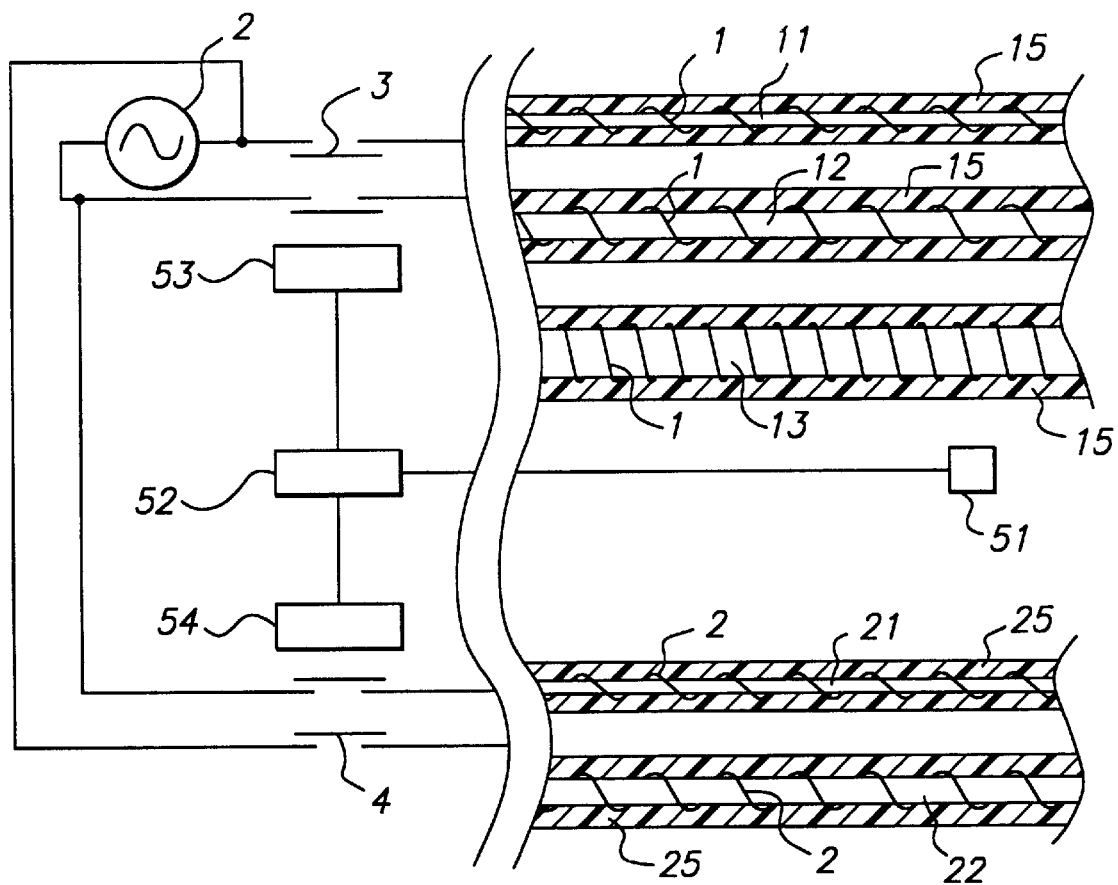

The invention can be used with any substrate, and any heater. However, it is of particular value when the substrate has non-uniform thermal characteristics, i.e. the thermal losses from the substrate and/or the heat supplied to the substrate vary from place to place. Particularly important substrates of this type are piping systems containing pipes of two or more different diameters. For such non-uniform substrates, it is necessary to make an actual or theoretical identification of the most vulnerable part of the substrate, i.e. the part which cools most rapidly, and to determine heat-up and cool-down durations which ensure that the temperature of the most vulnerable part does not drop below a specified minimum. In a system containing pipes of different diameters, the most vulnerable part will often be one of the smallest diameter pipes in which there is little or no flow of liquid. If the substrate can be used in different ways, e.g. for different flow patterns in a piping system, then the most vulnerable part of the substrate will often depend upon the way in which the substrate is being used. In this case, the heat-up and cool-down durations must be determined by reference to the most vulnerable part of the substrate in any possible use, or the control system must identify the particular use and then determine the heat-up and cool-down durations for the most vulnerable part of the substrate in that particular use.

The determination of the heat-up and cool-down durations can conveniently be done by determining the thermal characteristics of the most vulnerable part of the substrate and of the heater and insulation associated therewith, and calculating the heat-up and cool-down durations which, for the sensed ambient temperature, will maintain that part of the substrate at a temperature which is between a lower-limit temperature $T_L$ and upper-limit temperature $T_U$. (For reasons explained below, $T_L$ will be somewhat higher, e.g. 3 to 15° F. higher, than the permitted minimum for the substrate.) Thus, assuming that the ambient temperature does not change, the most vulnerable part of the substrate will heat from $T_L$ to $T_U$ during the heat-up period and cool from $T_U$ to $T_L$ during the cool-down period. The same result can be achieved by defining a reference system composed of a reference substrate, heater and insulation, each having a known relationship to the most vulnerable part of the substrate and the heater and insulation associated therewith, and determining heat-up and cool-down durations for the reference system using different values for $T_U$ and $T_L$ corresponding to that relationship. For example, in a piping system containing pipes of different sizes, the same heat-up and cool-down durations might be determined as the durations needed to maintain the pipes of 0.5 inch diameter between 148 and 152° F., or as the durations needed to maintain pipes of a larger diameter between 159 and 161° F.

In a preferred embodiment, the duration of each heat-up period and the duration of the immediately preceding or immediately following cool-down period are each a function of the ambient temperature sensed at a single time, and each heat-up duration, expressed in hours is a function of the expression $$-RC \ln\left(1 - \frac{T_U - T_L}{T_A + RQ - T_L}\right) \quad \text{(I)}$$

and each cool-down duration, expressed in hours, is a function of the expression $$-RC \ln\left(1 - \frac{T_U - T_L}{T_U - T_A}\right) \quad \text{(II)}$$

where
R is the effective thermal resistance, expressed in hour °F./BTU, of reference thermal insulation surrounding a reference substrate,
C is the thermal capacity of the reference substrate, expressed in BTU/°F.,
$T_U$ is the upper-limit temperature, expressed in °F.,
$T_L$ is the lower-limit temperature, expressed in °F.,
$T_A$ is the ambient temperature, expressed in °F. at the discrete time, and is less than $T_U$,
Q is the power of the reference heater, expressed in BTU/hour and is such that RQ is greater than $T_L-T_A$.
The power of the heater (Q) can be the actual power of the heater, determined empirically, in which case the most vulnerable part of the substrate will cycle between $T_L$ and $T_U$, or alternatively Q can be the rated power of the heater, in which case (assuming that the rated power is less than the actual power) the most vulnerable part of the heater will cycle between a lower temperature which is greater than $T_L$ and an upper temperature which is greater than $T_U$.

Preferably the heat-up duration is equal to the expression (I) and the cool-down duration is equal to the express (II) when the sum of the expressions is less than a fixed period which is from 0.5 to 1.3 hours; and the heat-up duration is p times the expression (I) and the cool-down duration is p times the expression (II) when the sum of the expressions is equal to or greater than said fixed period, where p is a number less than 1 such that the sum of the heat-up duration and the cool-down duration is equal to the fixed period.

The cool-down duration can be equivalently expressed as a function of the expression $$RC \ln\left(\frac{T_{MAINT} - T_A + DB}{T_{MAINT} - T_A - DB}\right)$$

and the heat-up duration can be equivalently expressed as a function of the expression $$RC \ln\left(\frac{T_A - T_{MIN.AMB} + DB}{T_A - T_{MIN.AMB} - DB}\right)$$

where
$T_{MAINT}$ is equal to $$\left(T_U + \frac{T_U - T_L}{2}\right),$$

and may be regarded as the average temperature expressed in °F., at which the reference substrate is preferably maintained,
$T_A$ is the ambient temperature, expressed in °F. at the discrete time,
DB is equal to $$\frac{T_U - T_L}{2},$$

expressed in °F., which may be regarded as the "dead band", or the amount by which the temperature of the reference substrate preferably varies above or below $T_{MAINT}$, and $T_{MIN,AMB}$ is the lowest ambient temperature, expressed in °F., at which the heater, operating continuously, can maintain the reference substrate at $T_{MAINT}$.

By way of illustration, Table 1 below shows, for various ambient air temperatures, the heat-up and cool-down durations in minutes and the cycle time (the sum of the heat-up and cool-down durations) calculated according to the above expressions for a pipe which has an outer diameter of 0.5 inch, which is surrounded by mineral fiber insulation 2.5 inch thick, and which is heated by a heater having a heating power of 22.76 BTU/hour, when $T_L$ is 148° F. and $T_U$ is 152° F. It may be noted that the cycle time depends upon the ambient temperature, being long at low ambient temperatures, decreasing to a minimum as the ambient temperature increases, and then again increasing.

TABLE 1

| $T_A$ (° F.) | Heat-up Duration (min.) | Cool-down Duration (min.) | Cycle Time (min.) |
|---|---|---|---|
| −10 | 33.71 | 2.51 | 36.22 |
| 0 | 18.28 | 2.68 | 20.96 |
| 10 | 12.55 | 2.87 | 15.42 |
| 20 | 9.56 | 3.09 | 12.65 |
| 30 | 7.72 | 3.35 | 11.07 |
| 40 | 6.47 | 3.65 | 10.12 |
| 50 | 5.57 | 4.01 | 9.58 |
| 60 | 4.89 | 4.46 | 9.35 |
| 70 | 4.36 | 5.02 | 9.38 |
| 80 | 3.93 | 5.74 | 9.67 |
| 90 | 3.58 | 6.69 | 10.27 |
| 100 | 3.29 | 8.03 | 11.32 |

In a first embodiment, the heater is switched on and off for the heat-up and cool-down durations which have been determined to maintain the most vulnerable part of the substrate between $T_L$ and $T_U$. In a second embodiment, the heater is switched on for a specified fraction or multiple of the heat-up duration determined in this way, and then switched off for the same fraction or multiple of the cool-down duration determined in this way. For example, the ambient temperature might be sensed at fixed times separated by a fixed period, and the ratio of the heat-up duration to the cool-down duration (as determined to maintain the substrate between $T_L$ and $T_U$) used to determine how the fixed period is to be divided between heating and cooling. The fixed period is preferably less than the minimum cycle time when the most vulnerable part of the substrate is to be maintained between $T_L$ and $T_U$, e.g. 2 to 9 minutes. In a third, and preferred, embodiment, the heat-up and cool-down durations are determined in accordance with the first embodiment if the cycle time so-calculated (i.e. the sum of the heat-up and cool-down durations) is less than a predetermined period, e.g. in the range 0.5 to 1.25 hours, for example 1 hour, and are determined in accordance with the second embodiment if the cycle time so-calculated is equal to or greater than the predetermined period.

The heat-up and cool-down durations do not take account of the actual temperature of the substrate or of changes in ambient temperature after the discrete time (or the last of the discrete times), the ambient temperature at which is used to determine those durations. The precise effect of the heating and cooling on the substrate, during particular successive heat-up and cool-down periods, will, therefore, depend on the temperature of the substrate at the beginning of the heat-up period and any changes which take place in the ambient temperature during the heat-up and cool-down periods. Since the substrate loses less heat at lower substrate temperatures than at higher substrate temperatures, the temperature of the substrate will adjust towards the lower limit $T_L$ at the end of the cool-down period. In a conventional heated piping system, the smaller the pipe, the more rapidly its temperature will adjust towards $T_L$. However, even for a small pipe, the time needed for a cold pipe to reach its maintenance temperature is substantially longer than the time which is needed if the heater is left on continuously. Therefore, although this invention can be used to heat a cold substrate to a desired maintenance temperature, it is preferred to operate the heater continuously when it is first switched on, e.g. for a fixed time, so that the substrate reaches an elevated temperature, preferably the desired maintenance temperature, before this invention is employed.

If the ambient temperature drops during a heat-up and/or cool-down period, the reference substrate will lose more heat than was assumed in the determination of the duration of that period, and the temperature of the substrate at the end of the cool-down period may, therefore, be less than $T_L$. Therefore, when the durations are determined by reference to the most vulnerable part of the substrate, $T_L$ should be somewhat higher than the minimum temperature permitted for the substrate by a safety margin which will depend upon the system, but may be for example 3° to 15° F. Correspondingly, when the heat-up and cool-down durations are determined by means of a reference system which has a known relationship to the most vulnerable part of the system, $T_L$ should be set somewhat higher than the temperature which corresponds to the minimum permitted temperature of the most vulnerable part of the substrate.

When the heat-up duration is the time needed to heat the reference substrate from $T_L$ to $T_U$, and the cool-down duration is the time needed for the reference substrate to cool from $T_U$ to $T_L$, the larger the difference between $T_U$ and $T_L$, the longer the cycle time (i.e. the sum of the heat-up and cool-down durations) at any particular ambient temperature, and the less frequently the heater is switched on and off. For example, a typical reference substrate might have, at an ambient of 40° F., a cycle time of 8 minutes when $T_L$ is 97° F. and $T_U$ is 103° F., and a cycle time of 17 minutes when $T_L$ is 90° F. and $T_U$ is 110° F. When the most vulnerable part of the substrate is the reference substrate, $T_U-T_L$ is typically 1 to 20° F., preferably 1 to 10° F., particularly 2 to 6° F. The corresponding cycle time will depend upon the substrate and the ambient temperature, but is typically 1 to 60 minutes for ambient temperatures of −10 to 100° F. and 5 to 30 minutes for ambient temperatures of 0 to 90° F. When the reference substrate is part of an alternative reference system, the difference between $T_U$ and $T_L$ preferably corresponds to differences of 1 to 20° F., preferably 1 to 10° F., particularly 2 to 6° F., in the most vulnerable part of the substrate. If there is a fixed cycle time (divided between heat-up and cool-down periods), the longer the cycle time, the greater the difference between $T_L$ and the highest temperature reached by the reference substrate. When there is a fixed cycle time, it is typically 1 to 20 minutes, preferably 2 to 15 minutes, particularly 5 to 9 minutes. If the fixed cycle time is less than the sum of the heat-up and cool-down durations calculated (at a particular ambient temperature) for the most vulnerable part of the substrate to cycle between $T_L$ and $T_U$ at the sensed ambient temperature, the most vulnerable part of the substrate will be heated to a temperature proportionately less than $T_U$. Conversely, if the fixed cycle time is more than the sum of those heat-up and cool-down durations, the most vulnerable part of the substrate will be heated to a temperature proportionately greater than $T_U$. Since the sum of those heat-up and cool-down durations depends on the ambient temperature (see Table 1 above), the highest temperature to which the substrate is heated in a fixed cycle varies with the ambient temperature.

When the method of the invention makes use of the ambient temperature sensed at a single time during the cycle of heating and cooling, (e.g. at the end of each heat-up period or at the end of each cool-down period) the interval between the discrete times at which the ambient temperature must be sensed is the same as the cycle time. When the ambient temperatures sensed at two or more discrete times are used to determined a heat-up duration, or a cool-down duration, or both, the discrete times are separated by a time which is typically at least 1 minute, preferably at least 2 minutes, particularly 5 to 15 minutes.

As the ambient temperature approaches the design minimum (i.e. the lowest ambient temperature at which the heater, when operated continuously and at full power, can maintain the substrate above a specified minimum temperature), the ratio of the heat-up period to the cool-down period increases. Preferably, the control system is set to switch the heater on continuously if the ambient temperature falls to a predetermined level, e.g. to a temperature which is equal to the design minimum plus $$\left(\frac{T_U - T_L}{2}\right)$$

°F.

As the ambient temperature approaches $T_U$, the ratio of the heat-up duration to the cool-down duration decreases and becomes zero when the ambient temperature reaches $T_U$. Furthermore, if the ambient temperature is above $T_L$, and the most vulnerable part is above $T_L$, no heating is in fact required (though no damage is done if the substrate is heated to $T_U$). It is preferred, therefore, that the control system be set to switch the heater off continuously when the ambient temperature reaches $(T_L-x)$°F. where x is 0 to 5° F., and is less than the safety margin between $T_L$ and the minimum permitted temperature for the substrate.

The invention can be used with any electrical heater, but is particularly useful for elongate heaters, including series and parallel constant wattage heaters (including in particular mineral insulated cable heaters and zone heaters) and self-regulating heaters, including in particular self-regulating heaters comprising PTC (positive temperature coefficient) elements. The PTC elements are preferably resistive heating elements but may be control elements connected between parallel bus wires and constant wattage resistive heating elements. Suitable PTC materials include PTC conductive polymers, which are generally preferred, and PTC ceramics. Particularly good results are obtained when the heater is a self-regulating heater, because the power output of such heaters decreases as the substrate temperature approaches the desired maintenance temperature. Elongate self-regulating heaters based on PTC conductive polymers, and suitable for heating pipes, are well-known and are available commercially, for example from Raychem Corporation under the trade names QTV and KTV. Although the power output of a self-regulating heater changes with temperature, it does not change very rapidly in the relatively narrow temperature band between $T_L$ and $T_U$. Therefore, the heat-up and cool-down periods can usually be determined with sufficient accuracy by the methods described above, which assume a constant power output. However, the invention includes the possibility of including the change in power output as one of the factors for calculating the heat-up and cool-down durations.

The fact that the power output of a self-regulating heater does not change much in the temperature band between $T_L$ and $T_U$ provides another important and unexpected advantage. It is conventional to monitor constant wattage heaters by observing the current draw. However, with self-regulating heaters used in the conventional way, the current drawn by the heater at any given time depends upon the difference between the temperature of the pipe and the temperature of the heater. This difference can vary widely, and as a result the current draw is not employed as a means for monitoring self-regulating heaters. However, as just noted, when a self-regulating heater is used in the present invention, its current draw during the heat-up period does not change much. In consequence, it is possible to combine the advantageous power savings which result from the use of a self-regulating heater (as compared to a constant wattage heater) with the measurement and/or display of the current drawn by the heater for monitoring purposes.

The determination of the heat-up and cool-down periods is preferably made with the aid of a microprocessor. The microprocessor can be one whose memory contains look-up tables of separately calculated heat-up and cool-down periods for each ambient temperature and for each heater or zone, or it can be one which computes, each time, the heat-up or cool-down period. Suitable microprocessors are well know, for example a Zilog Z 80180 or a Motorola 68HC 7C 05 C8. The program instructions can for example be stored in a 64K EPROM and 8K of non-volatile RAM used for data storage. A CMOS programmable peripheral digital I/O can be used to interface with a keypad. An A to D converter can be used to interface with the temperature sensor.

An example of a suitable pseudo-program code for the microprocessor is shown below.

```
TOLERANCE = 0.1 sec.        /*temperature offset to prevent math singularity*/
TIME_MAX-CYCLE = 3600 secs. /maximum permitted cycle time*/
TIME_RECHECK = 500 secs.    /*time to recheck ambient temp. when outside control range*/
TIME_CYCLE = 0.0 (On start up only)  /*forces an ambient check and updates calculations*/
if TIME_CURRENT ≧ TIME_CYCLE then  /*time to update calculation*/
                              /*TIME_CURRENT is the current time kept by the controller*/
    Measure current ambient temperature, T_A
    if T_A > (T_MAINT - T_DB - TOLERANCE) then      /*ambient is above maintain*/
        TIME_CYCLE = TIME_CURRENT + TIME_RECHECK
        TIME_OFF = TIME_CURRENT - 1.0
    else
    if T_A < (T_MIN.AMB + T_DB + TOLERANCE) then    /*amb. is below min. amb.*/
        TIME_CYCLE = TIME_CURRENT + TIME_RECHECK
        TIME_OFF = TIME_CYCLE + 1.0
    else                                            /*amb. is within control range*/
```

-continued $$\text{TIME}_{HEAT} = RC * \ln\left(\frac{T_A - T_{MINAMB} + DB}{T_A - T_{MINAMB} - DB}\right)$$

$$\text{TIME}_{COOL} = RC * \ln\left(\frac{T_{MAINT} - T_A + DB}{T_{MAINT} - T_A - DB}\right)$$

```
TIME_TOTAL = TIME_HEAT + TIME_COOL
    if TIME_TOTAL > TIME_MAX-CYCLE then   /*limit and scale duty cycle*/
        TIME_CYCLE = TIME_CURRENT + TIME_MAX-CYCLE
```

$$\text{TIME}_{OFF} = \text{TIME}_{CURRENT} + \frac{\text{TIME}_{HEAT} * \text{TIME}_{MAX-CYCLE}}{\text{TIME}_{TOTAL}}$$

```
        else                                  /*natural duty cycle*/
            TIME_CYCLE = TIME_CURRENT + TIME_TOTAL
            TIME_OFF = TIME_CURRENT + TIME_HEAT
        end if
      end if
    end if
    if TIME_CURRENT ≧ TIME_OFF then /*heaters are turned on in the first half of the cycle*/
        Heaters off
    else
        Heaters on
    end if
```

The ambient temperature can be sensed by any suitable temperature sensor. Suitable sensors are well known, for example the Resistance Temperature Device available from Raychem Corporation under the trade name RTD 300.

The microprocessor is preferably programmed so that, if it receives no input from the ambient temperature sensor, it sets off an alarm and preferably initiates a back-up program which ensures that the system comes to no harm, e.g. switches on all the heaters controlled by it. Similarly, the system preferably includes an alarm which is set off if the power supply fails.

Referring now to FIG. 1, which is a diagrammatic illustration of a system of the invention, pipes 11, 12 and 13 have different diameters and are surrounded by thermal insulation, 15, and pipes 21 and 22 also have different diameters and are surrounded by thermal insulation 25. Between each of pipes 11, 12 and 13 and the insulation 15 lies an elongate self-regulating heater 1; the same heater is wrapped around each of the pipes, but the larger the diameter of the pipe, the greater the wrapping frequency. Similarly a heater 2 is wrapped around the pipes 21 and 22 under the insulation 25. The heater 1 is connected, by connections not shown, to an AC power source 2, and can be switched on and off by contacter 3. Similarly, the heater 2 is connected, by connections not shown, to the AC power source 2 and can be switched on and off by contacter 4. An ambient air temperature sensor 51 is placed in the vicinity of the thermally insulated pipes in a position where it will sense an ambient air temperature which is representative of the pipe system generally. The sensor 51 is connected to a microprocessor 52. The microprocessor 52 has been programmed to compute, for a given ambient temperature supplied to it by the sensor 51 and for the heater 1, a heat-up duration which will cause the smallest insulated pipe, 11, to increase in temperature from a lower limit $T_{L1}$ to an upper limit $T_{U1}$, and a cool-down duration which will cause the pipe 11 to cool from $T_{U1}$ to $T_{L1}$. The microprocessor makes this computation at the end of each cool-down period, and uses it to control a relay 53 which operates the contacter 3. Similarly, the microprocessor 52 has been programmed to compute, for a given ambient temperature supplied to it by the sensor 51 and for the heater 2, a heat-up duration which will cause the smaller pipe 21 to increase in temperature from a lower limit $T_{L2}$ to an upper limit $T_{U2}$, and a cool-down duration which will cause the pipe 2 to cool from $T_{U2}$ to $T_{L2}$. The microprocessor makes this computation at the end of each cool-down period and uses it to control the relay 54 which operates the contacter 4.

In a modification of the method of the invention in which the sum of the heat-up and cool-down variations is a fixed period, the heater is operated at less than its full power, continuously throughout the fixed period (or over one or more periods whose duration is greater than a heat-up duration determined for a heat-up period when the heater is operated at full power), the proportion of the full power employed being such that the heater provides to the substrate, during the fixed period, an amount of heat which will cause the substrate to be at $T_L$ at the end of the fixed period (assuming that the substrate is in fact at $T_L$ at the beginning of the fixed period and the ambient temperature does not change during the fixed period.)

What is claimed is:

1. A method of heating a fluid transfer system comprising a plurality of pipes which are surrounded by thermal insulation, the system comprising a plurality of zones having different heating requirements and each of the zones including at least one elongate electrical heater which (i) lies between the pipes in that zone and the thermal insulation surrounding them, and (ii) is switched on and off during successive heat-up and cool-down periods, thereby maintaining all the pipes in that zone above a minimum temperature, the method comprising, for each of the zones separately, (1) determining a heat-up duration for each successive heat-up period as a function of ambient air temperature at one or more discrete times before the end of the heat-up period, the heat-up duration being a function of the time needed, for the ambient temperature at the discrete time, for a reference heater to heat a reference substrate from a lower-limit temperature $T_L$ to an upper-limit temperature $T_U$, where $T_U - T_L$ is 1 to 15° F.;

(2) determining a cool-down duration for each successive cool-down period as a function of ambient air temperature at one or more discrete times before the end of the cool-down period, the cool-down duration being a function of the time needed, for the ambient temperature at the discrete time, for the reference substrate to cool from $T_U$ to $T_L$, the reference substrate being surrounded by reference insulation and the reference heater being placed between the reference substrate and the reference insulation;

(3) switching the heater on during the successive heat-up periods for the heat-up durations determined in step (2); and (4) switching the heater off during the successive cool-down periods for the cool-down durations determined in step (3), the duration of each heat-up period and the duration of the immediately preceding or immediately following cool-down period each being a function of the ambient temperature sensed at a single time, and the heat-up duration, expressed in hours, being a function of the expression $$-RC \ln\left(1 - \frac{T_U - T_L}{T_A + RQ - T_L}\right) \quad (\text{I})$$

and the cool-down duration, expressed in hours, being a function of the expression $$-RC \ln\left(1 - \frac{T_U - T_L}{T_U - T_A}\right) \quad (\text{II})$$

where

R is the effective thermal resistance, expressed in hour °F./BTU, of the reference thermal insulation surrounding the reference substrate, C is the thermal capacity of the reference substrate, expressed in BTU/°F., $T_U$ is the upper-limit temperature, expressed in °F., $T_L$ is the lower-limit temperature, expressed in °F., $T_A$ is the ambient temperature, expressed in °F. at the discrete time, and is less than $T_U$, and Q is the power of the reference heater, expressed in BTU/hour and is such that RQ is greater than $T_L - T_A$.

2. A method according to claim 1 wherein the heater has a rated power Q, and the heat-up and cool-down durations take account of a comparison made between the actual power and the rated power of the heater.

3. A method according to claim 2 wherein the comparison was made as part of a start-up procedure.

4. A method according to claim 2 wherein the comparison is made from time to time during operation of the method.

5. A method according to claim 1 wherein Q has been determined empirically.

6. A method according to claim 1 wherein the heat-up duration is equal to the expression (I) and the cool-down duration is equal to the expression (II) when the sum of the expressions is less than a fixed period which is from 0.5 to 1.3 hours; and the heat-up duration is p times the expression (I) and the cool-down duration is p times the expression (II) when the sum of the expressions is equal to or greater than said fixed period, where p is a number less than 1 such that the sum of the heat-up duration and the cool-down duration is equal to the fixed period.

7. A method of maintaining a substrate above a minimum temperature by means of an electric heater, the heater being switched on and off during successive and alternating heat-up and cool-down periods, the substrate being thermally insulated by thermal insulation, and the heater lying between the substrate and the thermal insulation, the method comprising (1) determining a heat-up duration for each successive heat-up period as a function of ambient air temperature in the vicinity of the substrate at one or more discrete times before the end of the heat-up period, the heat-up duration being a function of the time needed, for the ambient temperature at the discrete time, for a reference heater to heat a reference substrate from a lower-limit temperature $T_L$ to an upper-limit temperature $T_U$, where $T_U - T_L$ is 1 to 10° F.;

(2) determining a cool-down duration for each successive cool-down period as a function of ambient air temperature in the vicinity of the substrate at one or more discrete times before the end of the cool-down period, the cool-down duration being a function of the time needed, for the ambient temperature at the discrete time, for the reference substrate to cool from $T_U$ to $T_L$ the reference substrate being surrounded by reference insulation and the reference heater being placed between the reference substrate and the reference insulation, (3) switching the heater on during the successive heat-up periods for the heat-up durations determined in step (2); and (4) switching the heater off during the successive cool-down periods for the cool-down durations determined in step (3);

the sum of each heat-up duration and the immediately succeeding cool-down duration being 2 to 60 minutes, and the duration of each heat-up period and the duration of the immediately preceding or immediately following cool-down period each being a function of the ambient temperature sensed at a single time, and the heat-up duration, expressed in hours, being a function of the expression $$-RC \ln\left(1 - \frac{T_U - T_L}{T_A + RQ - T_L}\right)$$

and the cool-down duration, expressed in hours, being a function of the expression $$-RC \ln\left(1 - \frac{T_U - T_L}{T_U - T_A}\right)$$

where

R is the effective thermal resistance, expressed in hour °F./BTU, of the reference thermal insulation surrounding the reference substrate, C is the thermal capacity of the reference substrate, expressed in BTU/°F., $T_U$, is the upper-limit temperature, expressed in °F., $T_L$ is the lower-limit temperature, expressed in °F., $T_A$ is the ambient temperature, expressed in °F. at the discrete time, and is less than $T_U$, and Q is the power of the reference heater, expressed in BTU/hour and is such that RQ is greater than $T_L - T_A$.

8. A method according to claim 7 wherein the heater has a rated power Q.

9. A method according to claim 7 wherein Q has been determined empirically.

10. A controller which can be used to control an electrical heater which is switched on and off during successive and alternating heat-up and cool-down periods, and which comprises (a) a sensor for sensing ambient air temperature,
(b) switching means for causing an electric heater to be connected to or disconnected from a source of electrical power; and
(c) a regulator which
   (i) is operatively connected to the sensor and the switching means,
   (ii) can operate the switching means so that the heater is connected to the power source during the heat-up periods and is disconnected from the power source during the cool-down periods, and
   (iii) comprises determining means which can determine heat-up and cool-down durations for the heat-up and cool-down periods as a function of the ambient air temperature sensed by the sensor at one or more discrete earlier times, said earlier times being separated by a time of at least 1 minute,
   (iv) determines, as a function of the ambient temperature sensed at one or more of the discrete times,
      (i) a heat-up duration which is a function of the time needed for a reference heater to heat a thermally insulated reference substrate from a lower-limit temperature to an upper-limit temperature, and
      (ii) a cool-down duration which is a function of the time needed for the reference substrate to cool from the upper-limit temperature to the lower-limit temperature,
      the reference body being surrounded by reference insulation and the reference heater being placed between the reference body and the reference insulation, and the determining means being a microprocessor which can determine the duration of each heat-up period as a function of the expression $$-RC \ln\left(1 - \frac{T_U - T_L}{T_A + RQ - T_L}\right)$$

and can determine the duration of each cool-down period as a function of the expression $$-RC \ln\left(1 - \frac{T_U - T_L}{T_U - T_A}\right)$$

where

R is the effective thermal resistance, expressed in hour °F./BTU, of the reference thermal insulation surrounding the reference substrate, C is the thermal capacity of the reference substrate, expressed in BTU/°F., $T_U$ is the upper-limit temperature, expressed in °F., $T_L$ is the lower-limit temperature, expressed in °F., $T_A$ is the ambient temperature, expressed in °F. at the discrete time, and is less than $T_U$, and Q is the power of the reference heater, expressed in BTU/hour, and is such that RQ is greater than $T_L - T_A$.

* * * * *